United States Patent Office 2,978,385
Patented Apr. 4, 1961

2,978,385

STABILIZED CHYMOTRYPSIN SOLUTION

Charles W. Damaskus, La Grange, Ill., assignor to Armour and Company, Chicago, Ill., a corporation of Illinois No Drawing. Filed July 5, 1957, Ser. No. 669,927

6 Claims. (Cl. 195—63)

This invention relates to an aqueous solution of chymotrypsin which is characterized by being substantially stable under ordinary conditions of commercial use.

It has long been known that chymotrypsin tends to be unstable and to become progressively inactivated when dissolved in aqueous solutions. Such inactivation proceeds quite rapidly under refrigeration as well as at room temperature, so it is not heretofore been possible to manufacture and sell chymotrypsin in the form of an aqueous solution. Such aqueous solutions, however, have definite advantages for both topical and parenteral applications, but heretofore the doctor has been required to prepare such solutions as needed from crystalline or lyophilized chymotrypsin.

It is therefore the general object of this invention to provide a substantially stabilized aqueous solution of chymotrypsin which is satisfactory for commercial manufacture and sale.

It has been previously suggested that calcium ions in aqueous solutions may tend to somewhat retard the inactivation of certain enzymes. I am not aware, however, that any such suggestion has been made with respect to chymotrypsin. Speaking generally, the use of calcium ions in aqueous solutions has not proven to have any particular value for commercial enzyme preparations. In connection with aqueous solutions of chymotrypsin, I have determined that many common water-soluble calcium salts do not materially improve the stability of the chymotrypsin. This invention is not therefore based on the use of calcium ions per se, but rather on the use of a specific calcium salt, calcium acetate, as the stabilizing agent. It was not until I discovered the unexpectedly superior stabilizing action of calcium acetate as compared with other calcium salts that it became possible to prepare substantially stabilized aqueous solutions of chymotrypsin.

In practicing the present invention, I prefer to use a substantially pure chymotrypsin starting material, that is, crystalline chymotrypsin or amorphous chymotrypsin of greater than 95% purity. Crystalline chymotrypsin can be prepared as described by Northrop et al., Crystalline Enzymes (2nd Ed., 1948). The principal chymotrypsin described in the cited reference is usually designated as the alpha form of chymotrypsin, but the reference also describes the preparation of beta and gamma chymotrypsins. For the purpose of the present invention, the alpha form of chymotrypsin is preferred.

The concentration of the chymotrypsin in the aqueous solution is not particularly critical, but for most purposes within the scope of the present invention it will fall within the range from 1 to 10 milligrams of chymotrypsin per cubic centimeter of water. My preferred formulations contain from 4 to 6 mg./cc. The proteolytic activity of the chymotrypsin may be measured by the hemoglobin substrate method (see J. Gen. Physiol., vol. 22, page 79), and when so measured will average at least 1000 activity units per milligram. A standard of potency by this method has been set up in terms of "Armour Units" (A.U.), U.S. Patent No. 2,871,165.

As indicated previously, this invention is based primarily on the use of calcium acetate as a specific stabilizing agent. I am unable to explain the mechanism, however, by which calcium acetate achieves the desired stabilization. Moreover, I cannot explain why calcium acetate is superior to other calcium salts. Apparently though it has to do with the presence of acetate ions in combination with the calcium ions. As far as I am aware, the action of acetate ions in promoting the stabilization of chymotrypsin is completely unexpected. For the purpose of the present invention, the concentration of calcium acetate in the aqueous solution should range from .05 to 1.2% by weight. The preferred concentration range for a parenteral preparation is from .15 to .25%.

In preparing the aqueous solution, it is desirable to use sterile distilled water, since for pharmaceutical use the final preparations should be sterile and should be free of any toxic contaminants. To achieve the benefits of the present invention, the pH of the solutions must be on the acid side. Generally, a pH ranging from 3.5 to 6.0 is suitable, but for a parenteral preparation a pH within the range from 3.7 to 4.3 is preferred. Various non-toxic acids such as hydrochloric acid, acetic acid, and the like, can be used to make the necessary pH adjustment. However, I have discovered that acetic acid is particularly suitable since it not only adjusts the pH to the desired level, but also provides additional acetate ions. It appears that the acetic acid and calcium acetate cooperate to enhance the desired stabilization action.

The chymotrypsin solutions may also advantageously contain a preservative agent like merthiolate. The use of such a preservative, however, is simply in accordance with well known practices for pharmaceutical preparations, and does not form a part of the present invention.

The present invention is further illustrated by the following specific examples.

EXAMPLE I

Pharmaceutically useful solutions of chymotrypsin were prepared from four different lots of chymotrypsin, each lot being substantially pure alpha chymotrypsin having a potency of about 1100 A.U./cc. After the preparation of the solutions according to Formula 1 as set out below, the solutions were sterile filtered and vialed in 5 cc. vials.

*Formula 1*

Chymotrypsin (alpha form) __ 5 mg./cc. (5500 A.U./cc.).
Sodium chloride _____ 0.9%.
Calcium acetate (as hydrate, 2H$_2$O) _____ 0.22%.
Merthiolate _____ 0.01%.
P.F. distilled water _____ Q.s.
pH (adjusted with acetic acid)_ 4.0.

The vials of chymotrypsin solution prepared as just described were subjected to shelf-life tests both at room temperature and under refrigeration. The results of these tests are set forth below in Table A.

TABLE A

| Lot No. | Initial Potency | After 3 Mo. R.T. | After 6 Mo. R.T. | After 3 Mo. Ref. | After 6 Mo. Ref. |
|---|---|---|---|---|---|
| a | 5,900 | 6,030 | 5,650 | 6,300 | 6,160 |
| b | 6,450 | 5,925 | 5,650 | 6,470 | 6,300 |
| c | 6,250 | 5,280 | 5,600 | 5,620 | 6,160 |
| d | 5,960 | 5,200 | 5,370 | 5,500 | 5,600 |
| Average | 6,140 | 5,608 | 5,550 | 5,972 | 6,055 |

EXAMPLE II

Further tests were conducted as described in Example 1, except that the solution was prepared according to Formula 2, as set out below.

Formula 2

| | |
|---|---|
| Chymotrypsin (alpha form) | 5 mg./cc. (5500 A.U./cc.). |
| Calcium acetate (as hydrate, $2H_2O$) | 1.0%. |
| Glycerine | 1.3%. |
| Merthiolate | 0.01%. |
| P.F. distilled water | Q.s. |
| pH (adjusted with acetic acid) | 5.0. |

In this test, only a single lot of substantially pure alpha chymotrypsin was used. The results obtained by a shelf-life test extending for four months with samples of the product under both room temperature and under refrigeration conditions are set out below in Table B.

TABLE B

| Initial Potency | After 4 Mo. R.T. | After 4 Mo. Ref. |
|---|---|---|
| 5,200 | 5,030 | 5,910 |

EXAMPLE III

A further test was conducted as described in Example 1, except a pH of 4.5 was employed. The resulting preparation was kept under refrigeration for nine months at the end of which time it was determined there had been no determinable loss in potency.

EXAMPLE IV

In another test conducted as described in Example 1 a pH of 4.0 was used, and the resulting preparation was subjected to both room temperature and refrigeration shelf-life test. At the end of seven and one-half months there was no measurable decrease in potency for either the room temperature or refrigeration samples.

While in the foregoing specification certain specific embodiments of the present invention have seen set forth for purpose of illustration, it will be understood that the invention is susceptible to other embodiments and that certain of the details set forth herein can be varied considerably without departing from the basic principles of the present invention.

I claim:

1. A substantially stabilized aqueous solution of chymotrypsin characterized by containing from .05 to 1.2% by weight of calcium acetate, said solution being at a pH of from 3.5 to 6.0 and having a concentration of alpha chymotrypsin ranging from 1 to 10 mg./cc.

2. A substantially stabilized aqueous solution of chymotrypsin characterized by containing from .15 to .25% by weight of calcium acetate and from 4 to 6 mg. of alpha chymotrypsin per cc. of water, said solution being at a pH of from 3.5 to 6.0.

3. A substantially stabilized aqueous solution of chymotrypsin characterized by containing from .05 to 1.2% by weight of calcium acetate and from 4 to 6 mg. of alpha chymotrypsin per cc. of water, the pH of said solution being adjusted to within the range of 3.5 to 6.0 with acetic acid.

4. A substantially stabilized aqueous solution of chymotrypsin, containing from .15 to .25% by weight of calcium acetate, from 4 to 6 mg./cc. of alpha chymotrypsin, and sufficient acetic acid to bring the pH thereof to the range of 3.7 to 4.3.

5. The aqueous solution of claim 1 wherein said solution has a pH within the range from 3.7 to 4.3.

6. The aqueous solution of claim 2 wherein said solution has a pH within the range from 3.7 to 4.3.

References Cited in the file of this patent

Biochim. et Biophys. Acta, vol. 19, pages 110–115 (1956).

J.A.C.S., vol. 74, pages 2122–2123.

Advances in Enzymology, vol. XIII, F. F. Nord, Interscience Publishers Inc., New York, 1952 (page 340).

Methods in Enzymology, vol. II, Colowick et al., Academic Press Inc., New York, 1955 (page 20).